No. 693,318. Patented Feb. 11, 1902.
H. BARDSLEY.
CLUTCH.
(Application filed Oct. 14, 1901.)
(No Model.)

Witnesses.
Oscar F. Hill
Arthur O. Randall

Inventor.
Henry Bardsley
by Macleod Calver & Randall
Attorneys.

UNITED STATES PATENT OFFICE.

HENRY BARDSLEY, OF PROVIDENCE, RHODE ISLAND, ASSIGNOR TO CROMPTON & KNOWLES LOOM WORKS, OF PROVIDENCE, RHODE ISLAND, A CORPORATION OF RHODE ISLAND.

CLUTCH.

SPECIFICATION forming part of Letters Patent No. 693,318, dated February 11, 1902.

Application filed October 14, 1901. Serial No. 78,520. (No model.)

*To all whom it may concern:*

Be it known that I, HENRY BARDSLEY, a citizen of the United States, residing at Providence, in the county of Providence, State of Rhode Island, have invented a certain new and useful Improvement in Clutches, of which the following is a specification, reference being had therein to the accompanying drawings.

The main objects of the invention are to produce a new and improved clutch which shall be adapted for general use on looms and other machinery, and more especially to produce a clutch which shall operate without tendency to press endwise in its bearings the shaft to which the clutch is applied in practice. This tendency in the case of preëxisting arrangements of clutch mechanism has the disadvantage of causing the shaft to run hard and produce wear.

The invention consists in clutch mechanism of the character which I will now proceed to describe with reference to the accompanying drawings, in which latter I have illustrated an embodiment of the invention in its best or preferred form.

Figure 1:
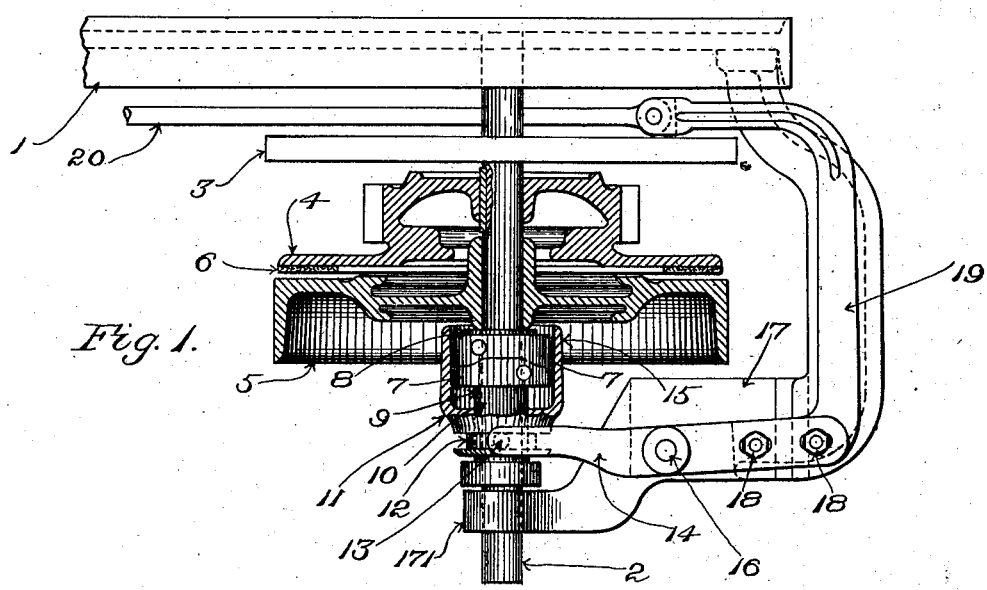
Figure 2:
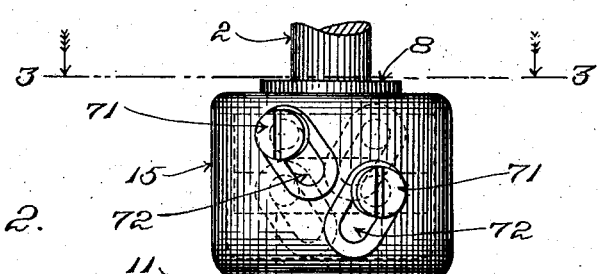
Figure 3:
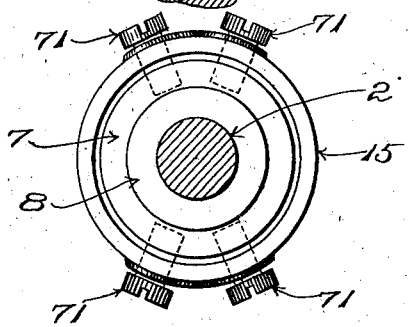

In the drawings, Figure 1 shows in plan, partly in horizontal section, the said embodiment of the invention. Fig. 2 is a detail view in plan on a larger scale. Fig. 3 is an end elevation of the parts which are represented in Fig. 2 with the shaft in vertical section.

Having reference to the drawings, 1 designates part of the framing of a machine in connection with which my improved clutch mechanism is supposed to be employed, and 2 is a rotating shaft which is mounted in suitable bearings (not necessary to be shown) in the said frame. 3 is a fly-wheel on the said shaft.

The invention is represented as embodied in connection with a friction-clutch, the main elements of which comprise the clutch member 4, which is fast with the shaft 2, and the clutch member 5, which is mounted on shaft 2 with capacity to turn thereon and also to move lengthwise of the shaft.

6 is a frictional surfacing of usual character interposed between the proximate faces of the clutch members 4 and 5 and fastened to one of the latter. The clutch member 5 is shown formed as a band-pulley suitable to receive or transmit power through the application of a driving-band thereto.

The features thus far described are not in themselves of the gist of the invention, and it will be understood that the character and construction of the clutch members *per se* may vary in practice.

For the purpose of occasioning driving interengagement of the coacting clutch members 4 and 5 I provide a pair of disks 7 7. These disks are mounted upon the shaft 2 adjacent the movable clutch member 5, a washer 8 being interposed between the hub of the said clutch member 5 and the disk 7 which comes next thereto. This washer is intended to take the wear that is incident to the working of the parts. The disks 7 7 and washer 8 are interposed between the said hub of the clutch member 5 and a relatively-fixed abutment, which is constituted by a shoulder at 9 upon the shaft 2, the said shoulder in the present case being constituted by the inner end of a sleeve 10, which is keyed upon the shaft. The respective disks 7 7 contact with each other by their proximate faces, these faces being shaped to constitute cams. The two disks 7 7 constitute an expanding pair of cam-disks. In the relative position in which they are shown in Fig. 1, with the cam projections of one disk received in the cam depressions of the other, the two disks are contracted into their narrowest width. This permits the clutch to open, as in Fig. 1. When, however, relative movement of the cam-disks is occasioned, the action of the cam-faces spreads the disks apart from each other, thereby expanding the same between the shoulder 9 and the movable clutch member 5, so as to force the movable clutch member 5 into driving engagement with the opposing clutch members 4. For the purpose of enabling the disks 7 7 to be moved as required in operating the clutch I provide an actuator, which in the illustrated embodiment of the invention is constituted by a collar 11, which is fitted upon the exterior of the sleeve 10 and formed with a groove 12 for the reception of the pins 13 on the fork of a shipper 14. The actuator or collar 11 is formed or provided with a cylindrical extension 15, constituting a bonnet, which incloses the disks. From the peripheries of the disks 7 7 project radial pins or screws 71 71, working in diagonal slots 72 72, which are formed in the bonnet 15. The slots 72, which receive the pins 71 of one disk, incline in one direction, while those which receive the pins or screws of the other incline in the opposite direction. Preferably there are two pairs of the pins or screws and slots. The said slots constitute, in effect, cams, and it will be perceived that movement of the collar and bonnet in one direction will move the disks 7 7 relatively to each other in a direction to expand or separate the disks, while movement of the said collar and bonnet then occurring in the reverse direction will permit the disks to contract together once more.

The shipper 14 is here shown as a lever pivoted at 16 upon a bracket 17, projecting outwardly from the frame 1 and provided with a bearing at 171, which fits the shaft 2 adjacent the outer end of the sleeve 10. The shipper-lever has bolted thereto at 18 18 an arm or extension 19, which extends inwardly toward the frame 1 and has connected therewith an operating-rod 20. The said arm 19 is U-shaped in order that it may extend around the clutch members and fly-wheel 3 without making contact therewith.

I claim as my invention—

1. The combination with the shaft, of the improved clutch comprising, essentially, coacting clutch members, the expanding pair of cam-disks mounted concentrically with relation to said shaft between a relatively fixed abutment thereon and the said clutch members, the movable actuator provided with cams in operative engagement with the cam-disks whereby to turn said cam-disks relatively to each other, and the shipper to move said actuator, substantially as described.

2. The combination with the shaft, of the improved clutch comprising, essentially, coacting clutch members, the expanding pair of cam-disks mounted concentrically with relation to said shaft between a shoulder thereon and the said clutch members, the movable actuator provided with the bonnet surrounding said cam-disks and furnished with the cams in operative engagement with the said cam-disks whereby to turn said cam-disks relatively to each other, and the shipper to move said actuator, substantially as described.

In testimony whereof I affix my signature in presence of two witnesses.

HENRY BARDSLEY.

Witnesses:
E. W. DAVENPORT,
E. NISBET.